(No Model.)
J. G. ANDERSON.
TOBACCO HANGER.
No. 425,284. Patented Apr. 8, 1890.
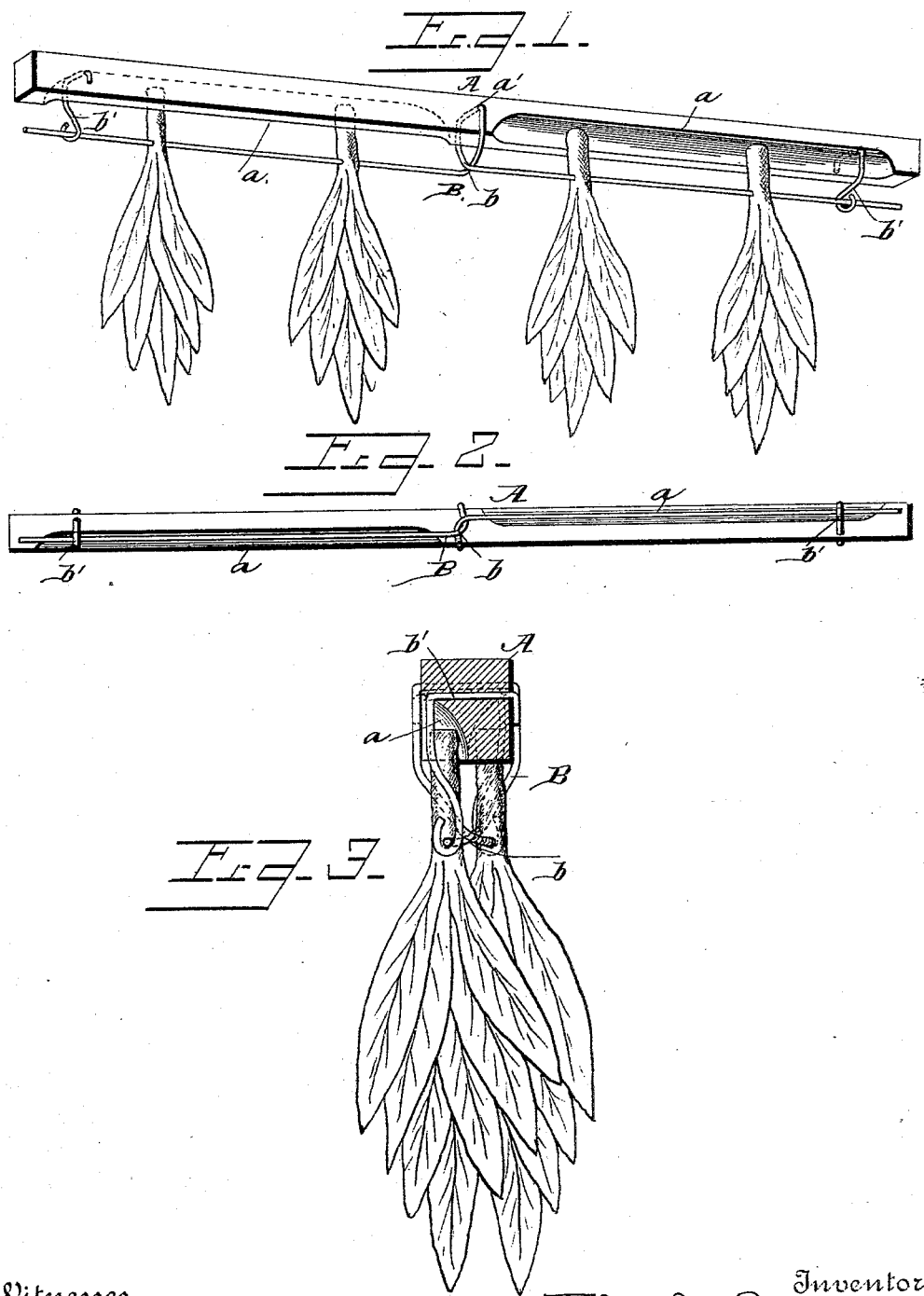
Witnesses
Geo. P. Thorpe.
David H. Mead.
Inventor
John G. Anderson
By his Attorney
R. S. Dyrenforth.

United States Patent Office.

JOHN G. ANDERSON, OF ALEXANDER, NORTH CAROLINA.

TOBACCO-HANGER.

SPECIFICATION forming part of Letters Patent No. 425,284, dated April 8, 1890.

Application filed June 3, 1889. Serial No. 312,957. (No model.)

*To all whom it may concern:*

Be it known that I, JOHN G. ANDERSON, a citizen of the United States, and a resident of Alexander, in the county of Buncombe and State of North Carolina, have invented certain new and useful Improvements in Tobacco-Hangers; and I do hereby declare the following to be a full, clear, and exact description of the same, such as will enable others skilled in the art to which it appertains to make and use the same.

This invention relates to tobacco-sticks.

The object of the invention is to produce a tobacco-hanger of such construction that when the leaves are hung upon it to dry they shall be entirely below and free from contact with the main portion of the stick.

Furthermore, the object of the invention is to produce a tobacco-hanger in which the wire upon which the leaves are suspended may be raised without coming in contact with the stick proper, thus avoiding any liability of breaking by rubbing the dry leaves against the stick in removing them.

Furthermore, the object of the invention is to produce a tobacco-hanger which will enable a number of them to be packed in a vehicle or in any other desired place when full without bringing the stems in contact with the sticks.

Furthermore, the object of the invention is to produce a tobacco-hanger of such construction as to enable the operator to use the same hand in filling both ends.

With these objects in view the invention consists, essentially, in a tobacco-hanger consisting in a bar or rod beveled on opposite sides, the bevels extending inward from the ends along the lower edge of the stick, and a bar or wire arranged entirely beneath the beveled portions of the bar and detachably connected with the bar.

I have illustrated the invention in the accompanying drawings, in which—

Figure 1 is a perspective view of a tobacco-stick constructed in accordance with my invention, and showing a number of leaves of tobacco hung thereon. Fig. 2 is an inverted plan view of the stick, and Fig. 3 is a transverse section showing the position of the leaves when hung upon the stick.

In the drawings, A designates a bar, preferably of wood, which is provided with cuts or bevels $a$. The bevels are arranged near each end and on opposite sides of the bar, in order to form recesses or indentations to allow the tobacco to be hung on the wire beneath the bar without touching it. The bevels being on opposite sides of the different ends allows one hand to be used in filling both ends of the stick.

B represents a wire arranged throughout its whole length beneath the bar A. The part B is preferably of metal, and in order that it may be economically applied to the stick I prefer to bend it, as shown in the drawings. The bar A is provided at its center with an opening $a'$, through which the wire B is passed, bent downward, and then each end given a half-turn, forming a locking-bend at $b$, the ends then extending parallel with the bar A and beneath the bevels to points near the ends of the stick, where they are sustained by hooks $b'$, depending from the bar A and receiving the ends of the wire B, from which the ends may be lifted at will.

From the foregoing it will be seen that in my device the suspension of the tobacco-leaves entirely under and free from the wooden stick can be accomplished, that the tobacco may be placed on and removed from the stick without coming in contact with the wooden portion, and also that a number of filled sticks may be packed without bringing the stems in contact with the bar of its particular stick or of adjacent sticks.

Having thus described my invention, what I claim as new, and desire to secure by Letters Patent, is—

A tobacco-hanger consisting in a bar or rod beveled on its lower face at opposite sides along the stick and a bar or wire arranged entirely beneath the beveled portions of the bar and detachably connected with the bar, substantially as described.

In testimony whereof I affix my signature in presence of two witnesses.

JOHN G. ANDERSON.

Witnesses:
   CHAS. W. MALONE,
   J. A. GRATTORY.